R. P. WHITE.

BAIL EAR FOR VESSELS.

APPLICATION FILED FEB. 24, 1919.

Reissued Aug. 5, 1919.

14,703.

Inventor:

Richard P. White

By Gillson & Gillson

Att'ys.

UNITED STATES PATENT OFFICE.

RICHARD P. WHITE, OF CHICAGO, ILLINOIS.

BAIL-EAR FOR VESSELS.

14,703. Specification of Reissued Letters Patent. Reissued Aug. 5, 1919.

Original No. 1,285,660, dated November 26, 1918, Serial No. 222,994, filed March 18, 1918. Application for reissue filed February 24, 1919. Serial No. 278,997.

*To all whom it may concern:*

Be it known that I, RICHARD P. WHITE, a citizen of the United States, residing at Chicago, in the county of Cook and State of Illinois, have invented certain new and useful Improvements in Bail-Ears for Vessels, of which the following is a specification.

My invention relates to improvements in bail ears for vessels.

One of the objects of my invention is to provide a bail ear for vessels, or other structures, and more particularly for vessels made of vitrifiable material, such as pottery ware, or the like, cheap of manufacture, which may easily and quickly be applied to the vessel and which tends, of itself, to adhere to the vessel by its inherent resiliency and which is more securely fixed in place by the effect of the weight of the vessel, when the latter is supported by the eye-engaging bail.

Other, further and more specific objects of my invention will become readily apparent, to persons skilled in the art, from a consideration of the following description, when taken in conjunction with the drawings wherein.

In all the views the same reference characters are employed to indicate similar parts.

Figure 1:
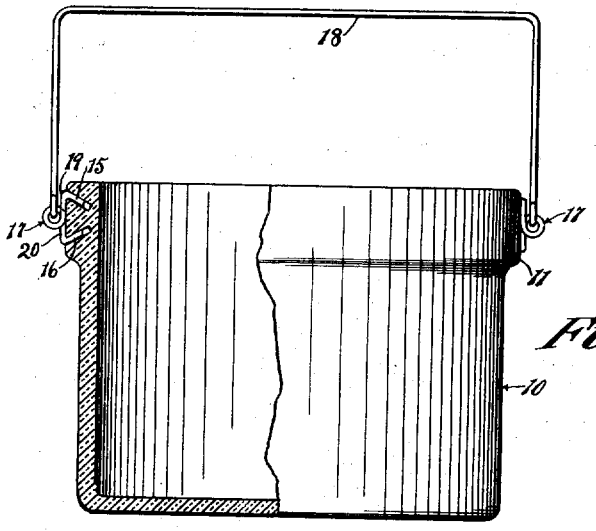
Figure 1 is an elevation of the vessel provided with a bail, with parts in section to show the bail ear.

In the drawings 10 is a vessel, preferably of vitrifiable material, having a border bead 11 around its open end. A pair of small openings 12 and 13 are made in the side wall of the bead 11 and preferably on diametrically opposite sides of the vessel. It will be observed that these openings are made at an angle approximately 90 degrees from each other and 45 degrees each from a diametric central plane. These openings are to contain the respective ends of the bail ears.

The bail ear 14 is preferably made of a single piece of spring wire, having terminal ends 15 and 16. Midway of the terminals 15 and 16 of the bail ears is an eye 17 formed of the same piece of wire from which the straight portions 19 and 20 extend tangentially in opposite directions. In this eye, the eye of the bail 18 is to engage.

Figure 2:
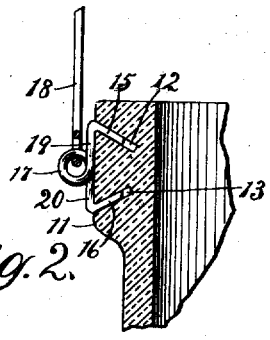
Fig. 2 is an enlarged section showing the bail ear in section.
Figure 5:
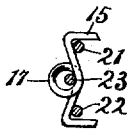
Fig. 5 shows the bail ear, with its attaching terminals yieldingly bent back temporarily, for insertion in the perforations provided in the side walls of the vessel.
Figure 3:
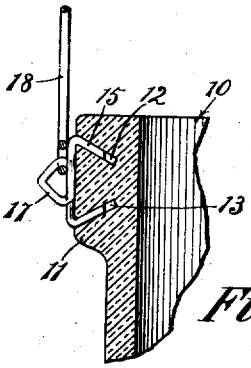
Fig. 3 is a similar view of a modified bail ear.
Figure 4:
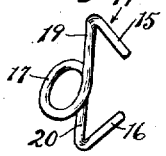
Fig. 4 is a perspective view of a bail ear.

The openings 12 and 13, made in the sides of the bead 11 of the vessel, are farther apart at the surface of the bead, where they emerge, than they are interiorly, as shown in Figs. 2 and 3. In applying the ear 14 I prefer to engage the eye 17 and the straight longitudinal extensions 19 and 20, of the ear, with a tool to spread the terminals 15 and 16 farther apart, so that they may be made to easily enter the openings 12 and 13 in the bead 11, as shown in Fig. 5. Such a tool would be in the nature of a pair of pliers having two separated prongs on one side and a single prong on the other. If such a tool be engaged with the ear in the manner indicated by Fig. 5, with the separated prongs, as 21, 22, in engagement with parts 19, 20, of the bail ear and the single prong, as 23, in engagement with loop 17; and if the tool, while so engaged, be operated to bring the prongs into alinement as illustrated in Fig. 5, extremities 15, 16, may be inserted into the openings in the vessel and then allowed to assume their normal position as illustrated in Fig. 2. The tool, forming no part of the present invention, has not been specifically illustrated.

The loop or eye 17, being of resilient material, will permit the parts to be temporarily moved back to the positions shown in Fig. 5, without difficulty, so that when the ends 15 and 16 are brought in register with the ends of the openings 12 and 13 and the ear is released, the eye will automatically move itself into the positions shown in Figs. 2 and 3, with respect to the bead 11, thereby exerting an inherent resilient tension that moves the terminals 15 and 16 into the openings 12 and 13, respectively, and holds the parts in place. After the ear terminals have been inserted, as described, they will remain in position.

If the eye 17 of the ear 14 is made angular and placed with two corners in a vertical plane, as shown in Fig. 3, the bail 18 will tend to be thereby forced closer up to the edge of the bead 11, by making the pull direct on the vertical part 20 and the terminal end 16, thereby tending more forcibly to hold the bail in its position within the openings in the bead and without interfering with the resilient operation of the device, in any respect.

While I have shown my invention applied to the exterior surface of a vessel made of vitreous material, it will be manifest to persons skilled in the art that it is not an essential feature of the invention, as it may be applied to other vessels or structures made of different materials, or in different forms, for instance, to other walls than a wall of a vessel, without departure from the spirit of the invention and within the scope of the appended claims.

The transitive verb "approximate" is used in the claims as a short and clear expression for "move toward" or "draw together."

I claim as my invention—

1. A bail ear comprising a coiled spring having portions extending in substantially opposite directions from its coil, the extremities of said portions bent at a convergent angle with each other.

2. A bail ear for a vessel, comprising a single piece of resilient wire bent into a coiled spring and having straight parts extending tangentially from the coil of said spring, in opposite directions from each side, each part terminating in an end bent inwardly, at an acute angle from said respective straight part, for inclusion in openings in a structure to which the ear is to be attached.

3. In combination with a vessel having two inwardly converging openings made in its side wall, a pair on opposite sides, of a bail ear comprising a single piece of spring wire bent into an eye and having straight parts extending tangentially from the eye in substantially opposite directions, each part terminating in an end bent inwardly at an angle from the respective straight parts, said ends for insertion in the respective openings provided in the vessel.

4. In combination, a bail ear or the like formed of a single strip of resilient material bent intermediate of its ends to form a loop, the end portions being crossed and projecting for a distance tangentially from the loop and then bent away from but in the plane of the loop, one of such bent portions forming an acute angle with its end portion.

5. In combination with a vessel having two pairs of spaced apart, inwardly-converging, bail-receiving openings in vertical alinement, said pairs being disposed in its side walls; a bail ear, providing an eye, having its end tangentially extending in opposite directions, each crossing the axis of the eye, and acutely bent toward each other at substantially the same angle with respect to the wall of the vessel as said openings, one said bail ear in each pair of openings and a bail engaging both ears.

6. A vessel and handle attachment therefor comprising a vessel having adjacent openings in a wall thereof out of parallel with each other, a resilient handle attachment having projections corresponding in number and direction with said openings, each projection lying within its corresponding opening and pressed against the periphery thereof by resilience of said attachment.

RICHARD P. WHITE.

Copies of this patent may be obtained for five cents each, by addressing the "Commissioner of Patents, Washington, D. C."